United States Patent
Cook et al.

(10) Patent No.: US 10,253,679 B2
(45) Date of Patent: Apr. 9, 2019

(54) VEHICLE THERMAL MANAGEMENT SYSTEM, AND METHODS OF USE AND MANUFACTURE THEREOF

(71) Applicant: Honda Motor Co., Ltd., Tokyo (JP)

(72) Inventors: Michael D. Cook, Raymond, OH (US); Matthew R. Scott, Marysville, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 248 days.

(21) Appl. No.: 14/817,914

(22) Filed: Aug. 4, 2015

(65) Prior Publication Data

US 2017/0037770 A1    Feb. 9, 2017

(51) Int. Cl.
| | | |
|---|---|---|
| *F01P 7/16* | (2006.01) | |
| *B60H 1/08* | (2006.01) | |
| *B60H 1/14* | (2006.01) | |
| *F28F 9/02* | (2006.01) | |
| *F28F 27/02* | (2006.01) | |
| *F01P 7/14* | (2006.01) | |
| *F28D 9/00* | (2006.01) | |

(52) U.S. Cl.
CPC ............... *F01P 7/165* (2013.01); *B60H 1/08* (2013.01); *B60H 1/14* (2013.01); *F01P 7/16* (2013.01); *F28F 9/0253* (2013.01); *F28F 27/02* (2013.01); *F01P 2007/146* (2013.01); *F28D 9/005* (2013.01)

(58) Field of Classification Search
CPC ........ F01P 7/165; F01P 7/16; F01P 2007/146; F28F 27/02; F28F 9/0253; B60H 1/08; B60H 1/14; F28D 9/005
See application file for complete search history.

(56) References Cited

U.S. PATENT DOCUMENTS

| | | | |
|---|---|---|---|
| 6,053,131 A | 4/2000 | Mueller et al. | |
| 6,427,640 B1 | 8/2002 | Hickey et al. | |
| 7,665,513 B2 | 2/2010 | Sasaki | |
| 8,066,198 B2 | 11/2011 | Palanchon et al. | |
| 8,100,106 B2 | 1/2012 | Kardos et al. | |
| 8,116,953 B2 * | 2/2012 | Lopez ................. | F16H 57/0413 180/337 |
| 8,689,742 B2 | 4/2014 | Myers et al. | |

(Continued)

FOREIGN PATENT DOCUMENTS

WO        2014039287 A1    3/2014

*Primary Examiner* — Devon Russell
(74) *Attorney, Agent, or Firm* — Kenealy Vaidya LLP

(57) ABSTRACT

A thermal management system for a vehicle including an engine and a transmission can include a radiator, first and second heat exchangers, a control valve and a bypass valve. The radiator can be configured for fluid communication with the engine. The first heat exchanger can be configured for fluid communication with the transmission. The control valve can be configured to selectively communicate a source of relative warm engine fluid or a source of relative cool engine fluid to the first heat exchanger in order to warm or cool the transmission fluid, respectively. The second heat exchanger can be configured to exchanger heat between the transmission fluid and the ambient fluid external to the passenger compartment of the vehicle. The by-pass valve can be configured to selectively direct transmission fluid into or to by-pass the second heat exchanger.

16 Claims, 3 Drawing Sheets

(56) References Cited

U.S. PATENT DOCUMENTS

| | | |
|---|---|---|
| 8,944,017 B2 | 2/2015 | Glassford |
| 9,234,604 B2* | 1/2016 | Kim ................. F28F 27/02 |
| 9,322,319 B2* | 4/2016 | Kim ................. F01P 3/18 |
| 9,664,462 B2* | 5/2017 | Jainek ............... F01M 11/03 |
| 2004/0187805 A1* | 9/2004 | Arisawa ............. F01P 7/162 |
| | | 123/41.14 |
| 2006/0060346 A1* | 3/2006 | Sasaki .............. F01P 11/08 |
| | | 165/297 |
| 2009/0101312 A1* | 4/2009 | Gooden ........... F16H 57/0413 |
| | | 165/104.19 |
| 2009/0114171 A1* | 5/2009 | Hayashi ............. F01P 3/02 |
| | | 123/41.44 |
| 2010/0031646 A1* | 2/2010 | Iwase ............... F01N 5/02 |
| | | 60/320 |
| 2011/0137530 A1* | 6/2011 | Kerns ............... F01P 7/10 |
| | | 701/49 |
| 2012/0161042 A1* | 6/2012 | Sheppard ........... F01M 5/007 |
| | | 251/11 |
| 2013/0087304 A1* | 4/2013 | Ahmed ............ B60H 1/00271 |
| | | 165/41 |
| 2013/0092349 A1 | 4/2013 | Curtis et al. |
| 2013/0255599 A1* | 10/2013 | Jentz ............... F01P 11/14 |
| | | 123/41.1 |
| 2014/0262135 A1* | 9/2014 | Sheppard .......... B60H 1/00314 |
| | | 165/42 |
| 2014/0262200 A1 | 9/2014 | Sheppard et al. |
| 2015/0204220 A1* | 7/2015 | Cook ................ F01P 3/20 |
| | | 60/320 |

* cited by examiner

VEHICLE THERMAL MANAGEMENT SYSTEM, AND METHODS OF USE AND MANUFACTURE THEREOF

BACKGROUND

The disclosed subject matter relates to a vehicle thermal management systems, and methods of use and manufacture thereof. More particularly, the disclosed subject matter relates to methods and apparatus that transfer heat between various vehicle operating fluids, and from the various vehicle operating fluids to ambient air.

A vehicle can include a plurality of working fluids, such as but not limited to engine coolant (e.g., water, ethylene glycol, or a combination of water and ethylene glycol), lubricating oil for the internal combustion engine, and fluid(s) (such as but not limited to lubricating oil, hydraulic fluid, or both) for the transmission. The engine coolant can be used to cool components of the internal combustion engine by absorbing heat from the engine components, and transferring heat to the ambient air via a heat exchanger (also referred to as a radiator). The engine coolant also can be used to warm the passenger compartment by directing engine coolant exiting the engine through a heat exchanger through which air from the passenger compartment also passes.

The engine oil and the transmission fluid(s) can absorb heat from the respective engine components and the transmission. Frictional losses in these liquids can also increase the temperatures of these liquids. Respective heat exchangers can facilitate the transfer of heat from engine oil and the transmission fluid(s) to the ambient air in order to cool the engine oil and the transmission fluid(s).

SUMMARY

The exhaust gas emissions of the internal combustion engine and the operating efficiency of powertrain components, such as an internal combustion engine and a multiple speed ratio transmission, are a function of the operating temperature of mechanical parts of the respective powertrain component and the operating temperature of the fluid(s) flowing through the respective powertrain component.

Related art internal combustion engines and transmissions are subject to various disadvantages. For example, at relatively low operating temperatures, the viscosity of the engine oils and the transmission fluid(s) is relatively high and the reaction efficiency of the catalytic converter is relatively low. Thus, the operating efficiencies of the engine and the transmission are relatively low.

In another example, during a cold-start condition in cold weather, the warm-up rate of the passenger compartment can be relatively low. By contrast, under heavy load conditions, the components of the engine and/or the transmission can be subject to excessive thermal exposure. Thus, the operating efficiencies of the engine and the transmission can be reduced below an optimum value due to thermal stress, improper viscosity values, as well as other variables related to excessive thermal exposure.

It may therefore be beneficial to provide a thermal management system that can efficiently regulate the flow and temperature of fluids (such as, but not limited to, engine coolant, engine oil, transmission lubricating oil, and transmission hydraulic fluid) in the powertrain in order to reduce or minimize powertrain warm-up, increase or maximize heat available for warming the passenger compartment and/or maintaining the powertrain fluids at enhanced or even optimum operating temperatures during all powertrain loads. In particular, it may be beneficial to utilize engine coolant to regulate the temperature of the transmission fluid(s). For example, it may be beneficial to selectively use engine relatively hot engine coolant to warm the transmission fluid(s) or relatively cold engine coolant to cool the transmission fluid(s).

Some embodiments are therefore directed to a thermal management system for a vehicle including an engine and a transmission. The system can include a radiator, a first heat exchanger, a hot branch line, an exchanger branch conduit, control valve, a second heat exchanger, and a by-pass valve. The radiator can be configured for fluid communication with the engine. The first heat exchanger can be configured for fluid communication with the transmission. The hot branch line can be configured for fluid communication with the engine. The exchanger branch conduit can be in fluid communication with the radiator. The control valve can be in fluid communication with the hot branch line, the exchanger branch conduit, and the first heat exchanger. The control valve can be configured to selectively connect the hot branch line in fluid communication with the first heat exchanger and to selectively connect the exchanger branch conduit in fluid communication with the first heat exchanger. A second heat exchanger can be in selective fluid communication with the first heat exchanger, and can be configured for fluid communication with the transmission. The by-pass valve can be in fluid communication with the first heat exchanger and the second heat exchanger. The by-pass valve can be configured for fluid communication with the transmission, and configured to selectively operate in a first mode and selectively operate in a second mode, wherein when in the first mode, fluid from the first heat exchanger bypasses the second heat exchanger and flows to the transmission, and when in the second mode, fluid from the first heat exchanger flows through the second heat exchanger and then flows to the transmission.

Some other embodiments are directed to a vehicle configured to carry at least one passenger, the vehicle can include an engine, a transmission, passenger compartment, and a thermal management system. The engine can include an engine fluid flowing therethrough. The transmission can include a transmission fluid flowing therethrough. The passenger compartment can contain an ambient fluid. The thermal management system can be in fluid communication with each of the engine, the transmission, and the passenger compartment, and the thermal management system can be configured to exchange heat between the engine fluid, the transmission fluid, the ambient fluid in the passenger compartment, and ambient fluid external to the passenger compartment. The thermal management system can include a radiator, a first heat exchanger, a hot branch line, an exchanger branch conduit, control valve, a second heat exchanger, and a by-pass valve. The radiator can be in fluid communication with the engine and can be configured to exchange heat between the engine fluid and the ambient air external to the passenger compartment. The first heat exchanger can be in fluid communication with the transmission and can be configured to exchange heat between the engine fluid and the transmission fluid. The hot branch line can be in fluid communication with the engine. The exchanger branch conduit can be in fluid communication with the radiator. The control valve can be in fluid communication with the hot branch line, the exchanger branch conduit, and the first heat exchanger, and can be configured to selectively connect the hot branch line in fluid communication with the first heat exchanger and to selectively connect the exchanger branch conduit in fluid communication with the first heat exchanger. The second heat exchanger can be in selective fluid communication with he first heat exchanger, in fluid communication with the transmission, and can be configured to exchange heat between the transmission fluid and the ambient fluid external to the passenger compartment. The by-pass valve can be in fluid communication with each of the first heat exchanger, the second heat exchanger, and the transmission. The by-pass valve can be configured to selectively operate in a first mode and selectively operate in a second mode, wherein when in the first mode, fluid from the first heat exchanger bypasses the second heat exchanger and flows to the transmission, and when in the second mode, fluid from the first heat exchanger flows through the second heat exchanger and then flows to the transmission.

Still other embodiments are directed to a method for directing fluid through a vehicle thermal management system. The method can include: providing an engine including engine fluid configured to flow through the engine, a transmission including a transmission fluid flowing therethrough, a radiator configured for fluid communication with the engine, a first heat exchanger configured for fluid communication with each of the engine and the transmission, a hot branch line configured for fluid communication with the engine, an exchanger branch conduit in fluid communication with the radiator, a control valve in fluid communication with the hot branch line, the exchanger branch conduit, and the first heat exchanger and configured to selectively connect the hot branch line in fluid communication with the first heat exchanger and to selectively connect the exchanger branch conduit in fluid communication with the first heat exchanger, a second heat exchanger in selective fluid communication with he first heat exchanger, and configured for fluid communication with the transmission, and a by-pass valve in fluid communication with the first heat exchanger and the second heat exchanger, configured for fluid communication with the transmission, and configured to selectively operate in a first mode and selectively operate in a second mode; connecting one of the hot branch line and the exchanger branch conduit in fluid communication with the first heat exchanger and simultaneously disconnecting another of the hot branch line and the exchanger branch conduit from fluid communication with the first heat exchanger based on a temperature of the transmission fluid flowing through the control valve; selectively operating the by-pass valve in the first mode so that transmission fluid from the first heat exchanger bypasses the second heat exchanger and flows to the transmission; and selectively operating the by-pass valve in the second mode so that transmission fluid from the first heat exchanger flows through the second heat exchanger and then flows to the transmission.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

1. Disclosed Embodiments

Figure 1:
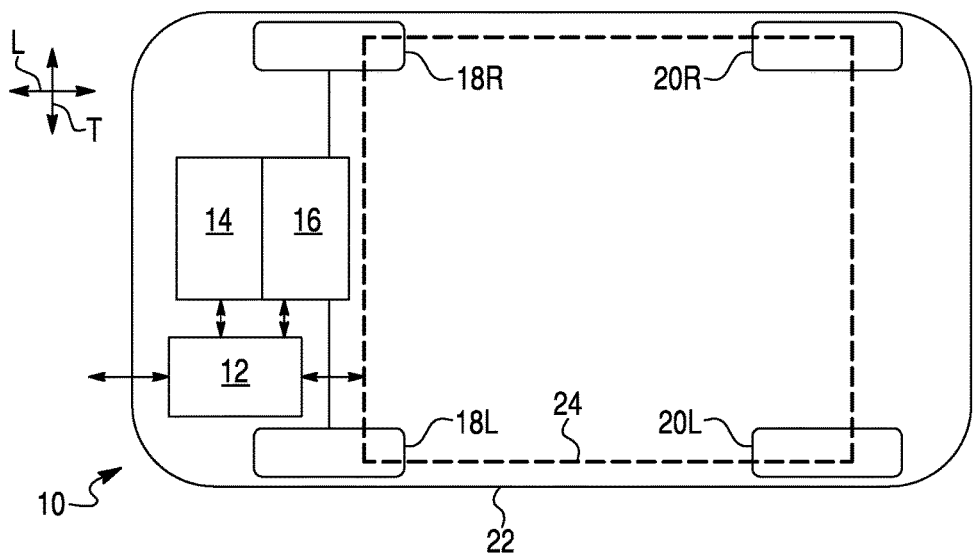
FIG. 1 is a schematic view of an exemplary embodiment of a vehicle including a thermal management system made in accordance with principles of the disclosed subject matter.

FIG. 1 schematically illustrates a vehicle 10 that can be configured to carry at least one passenger inside a passenger compartment 24. The vehicle 10 can include an exemplary thermal management system 12 made in accordance with principles of the disclosed subject matter. The vehicle 10 can include an internal combustion engine 14, a transmission 16, a pair of front wheels 18L,R, a pair of rear wheels 20L,R, and a body 22. The body 22 can include the passenger compartment 24 (indicated schematically by a dashed line).

The system 12 can control fluid communication (indicated by the double headed arrows) between the internal combustion engine 14, the transmission 16, the passenger compartment 24, and the ambient environment in order to regulate the heat transfer amongst the engine 14, the transmission 16, and the passenger compartment 24. The thermal management system 12 can enhance or improve fuel efficiency of the vehicle 10, reduce or minimize emissions resulting from combustion in the engine 14, enhance responsiveness of the climate control for the passenger compartment 24, and/or reduce or minimize the thermal effects on the engine 14 and/or the transmission 16.

Figure 2:
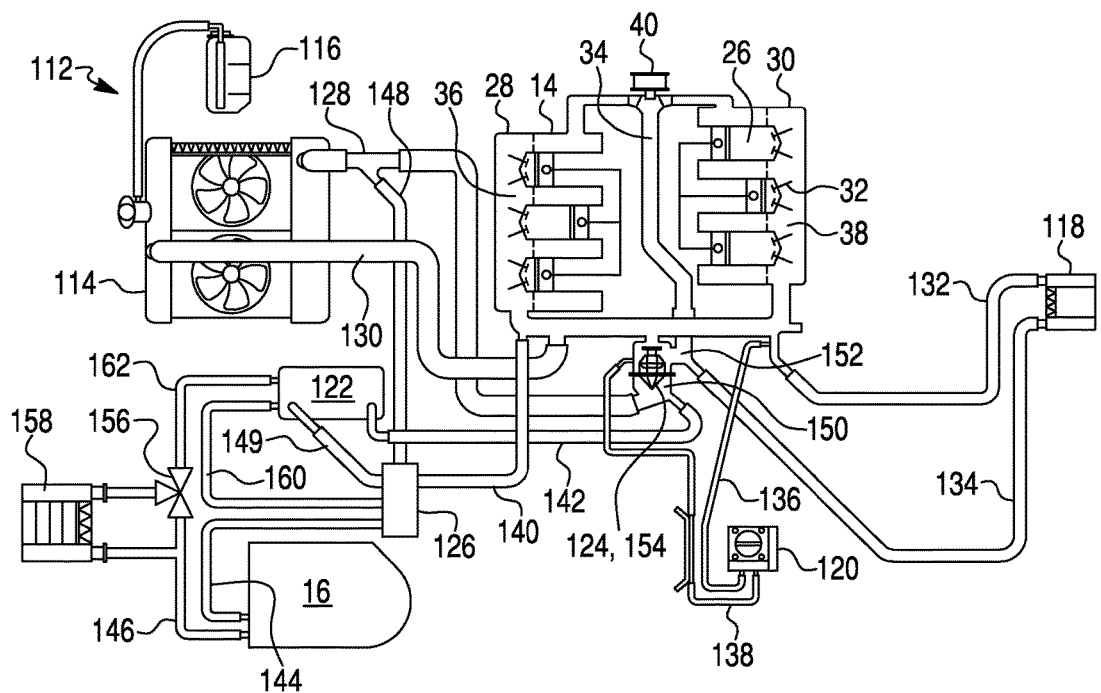
FIG. 2 is a schematic view of an embodiment of a thermal management system for a vehicle made in accordance with principles of the disclosed subject matter.

FIG. 2 illustrates and exemplary embodiment of a thermal management system 112 in accordance with the principles of the disclosed subject matter. The fluids acted upon by the system 112 can be engine fluid (such as but not limited to water, ethylene glycol, or a combination of water and ethylene glycol), transmission fluid (such as, but not limited to, lubricating oil and hydraulic oil (also known as automatic transmission fluid or ATF)), ambient air, and air inside the passenger compartment 24.

This exemplary thermal management system 112 can include a radiator 114, a reservoir 116, a heater core 118, a first heat exchanger 122, a thermostat 124, a control valve 126, a by-pass valve 156, a second heat exchanger 158, and a plurality of conduits 128, 130, 132, 134, 136, 138, 140, 142, 144, 146, 148, 162. As will be discussed in detail below, the thermostat 124, the control valve 126, and the by-pass valve 156 can regulate the flow of the respective one of engine fluid and transmission fluid to/from the respective one of the radiator 114, the first heat exchanger 122 and the second heat exchanger 158.

FIG. 2 also schematically illustrates further exemplary details of the engine 14. The engine 14 can include one or more combustion cylinders 26 that can be arranged along a straight line, in a V-shape, in a W-shape, or horizontally opposed. In the exemplary embodiment of FIG. 2, the engine 14 can include a plurality of cylinders 26 arranged in a first bank 28 and a second bank 30. The first and second banks 28, 30 can be arranged in a V-shape or the banks 28, 30 can be horizontally opposed. Each cylinder 26 can include at least one valve 32 that can be configured to selectively connect the respective cylinder 26 for fluid communication with the ambient environment via an induction system and an exhaust system in any appropriate manner.

The thermal management system 112 can include a water jacket formed in the engine 14. In the exemplary embodiment schematically represented in FIG. 2, the water jacket can include an inlet portion 34 and two bank portions 36, 38. The inlet portion 34 can be in fluid communication with an outlet 152 of the thermostat 124. Each of the bank portions 36, 38 can be in fluid communication with the inlet portion 34 and with a main fluid supply conduit 130. Heat generated in each of the cylinders 26 can be transferred to the engine fluid flowing through the water jacket 34, 36, 38 and then distributed throughout the thermal management system 112 and/or the ambient environment in a manner most advantageous for the operating conditions of the vehicle and the climate control request(s) for the passenger cabin.

The thermal management system 112 can include a water pump 40 that can be in fluid communication with the water jacket 34, 36, 38 and can cause the engine fluid to circulate through the thermal management system 112. The water pump 40 can be driven by the engine 14 or by a separate power source, such as but not limited to an electric motor.

The radiator 114 can facilitate the transfer of heat from the engine fluid to the air of the ambient environment external to the passenger compartment 24 in order to cool the engine fluid. The radiator 114 can receive fluid from the engine 14 and receive air from the ambient environment. Engine fluid in the radiator 114 can be selectively returned to the engine 14 via the thermostat 124.

During a cold-start condition, the temperature of the engine fluid flowing through the water jacket 34, 36, 38 is below a first predetermined temperature. When the engine fluid is below this first predetermined temperature, the viscosity of the engine oil can be relatively high. Therefore, the friction between the moving components of the engine 14 can be relatively high and the resistance required to pump the engine oil through the engine and to move the engine components through the engine oil can be relatively high. This can reduce the energy available to propel the vehicle and/or increase the fuel consumption by the engine 14. Increased fuel consumption can reduce the effectiveness of the catalytic converter, especially if an enhanced or the optimum operating temperature of the catalyst has not been achieved.

Furthermore, the thermal demand on the engine fluid from the heater core 118 can be high during the cold-start condition. Since the engine fluid loses heat to the heater core 118, the duration of the cold-start condition can be increased.

When the transmission fluid is below a second predetermined temperature, the viscosity of the transmission fluid can be relatively high. Therefore, the friction between the moving components of the transmission 16 can be relatively high and the resistance required to pump the transmission fluid through the transmission 16 and to move the transmission components through the transmission fluid can be relatively high. This increased friction also can reduce the energy available to propel the vehicle and/or increase the fuel consumption by the engine 14. Increased fuel consumption can also reduce the effectiveness of the catalytic converter.

In order to reduce or minimize one or more of these potentially adverse effects, the thermal management system 112 can direct the flow of engine fluid to by-pass the radiator 114 and the first heat exchanger 122 and can simultaneously permit the flow of engine fluid to pass through the water jacket 34, 36, 38, the heater core 118 and the throttle body 120. As a result, the heat transfer rate between the engine 14 and the engine fluid can be an enhanced or maximum value and the heat transfer rate between the engine fluid and each of the heater core 118 and the throttle body 120 and can be an enhanced or maximum value. Thus, the time elapsed for warm-up of the engine 14, the engine fluid, and the passenger compartment can be reduced or minimized.

The thermostat 124 can include a thermostat inlet 150, a thermostat outlet 152 and a thermostat valve structure 154. A main fluid return conduit 128 can extend from the radiator 114 to the thermostat inlet 150 to provide communication of engine fluid from the radiator 114 to the thermostat inlet 150. The main fluid supply conduit 130 can extend from the engine 14 to the radiator 114 to provide communication of engine fluid from the engine 14 to the radiator 114. An actuator can be configured to cause the thermostat valve structure 154 to selectively open and close communication of engine fluid from the thermostat inlet 150 to the thermostat outlet 152.

The actuator can be responsive to the temperature of the fluid exiting the engine 14 in order to cause the thermostat valve structure 154 to selectively open and close the communication of engine fluid from the thermostat inlet 150 to the thermostat outlet 152. The actuator can be configured to cause the thermostat valve structure 154 to close communication of engine fluid from the thermostat inlet 150 to the thermostat outlet 152 when the temperature of the engine fluid is less than the first predetermined temperature described above. The actuator can be configured to cause the thermostat valve structure 154 to open communication of engine fluid from the thermostat inlet 150 to the thermostat outlet 152 when the temperature of the engine fluid is equal to or greater than the first predetermined temperature described above. The actuator can be a mechanical structure such as, but not limited to, a wax motor in combination with a spring. In an alternate embodiment, the actuator can be an electrically driven device (such as, but not limited to a thermal sensor in electrical communication with a solenoid or an electric motor) that can be actuated by an input signal received from a thermal sensor and/or an electronic control unit. The thermal sensor can be in fluid communication with the engine fluid exiting the engine 14.

When the actuator causes the thermostat valve structure 154 to close fluid communication from the thermostat inlet 150 to the thermostat outlet 152, engine fluid from the radiator 114 can be impeded or prevented from entering the engine 14, or at least limited to a negligible flow rate value into the engine 14. Since the flow rate of engine fluid through the thermostat 124 can be zero or limited to a negligible value, the flow rate of engine fluid from the engine 14 to the radiator 114 via the main fluid supply conduit 130 can be zero or limited to a negligible value. Therefore, engine fluid flowing through the water jacket 34, 36, 38 can by-pass the radiator 114.

When the temperature of the engine fluid is greater than or equal to the first predetermined temperature, the actuator can cause the valve structure 154 to open fluid communication from the thermostat inlet 150 to the thermostat outlet 152. Thus, engine fluid from the radiator 114 can flow through the thermostat 124 and into the engine 14 at a flow rate sufficient to maintain the operating temperature of the engine fluid within a desired range of temperature values that can be advantageous for engine performance.

The reservoir 116 can be in fluid communication with the radiator 114. The reservoir 116 can store fluid that can be used to replace fluid lost from the volume of fluid circulating in the thermal management system 112. The reservoir 116 can be used to relieve the pressure of the fluid circulating in the system 112 under certain operating conditions.

The heater core 118 can facilitate the transfer of heat from the engine fluid to the ambient air in the passenger compartment (see, for example, 24 in FIG. 1) in order to warm the ambient air in the passenger compartment. A heater supply conduit 132 can extend from the engine 14 to the heater core 118 to provide communication of engine fluid from the engine 14 to the heater core 118. As viewed in FIG. 2, the heater supply conduit 132 can extend from the engine 14 at a position in fluid communication with the right bank portion 38.

The thermal management system 112 can include a fan and ducting located in the passenger compartment 24. The fan and ducting are omitted from FIG. 2 for simplicity and clarity of the illustration. The fan and ducting can be configured to circulate the ambient air of the passenger compartment between the passenger compartment 24 and the heater core 118.

A heater return conduit (or line) 134 can extend from the heater core 118 to the thermostat outlet 152 to provide communication of engine fluid from the heater core 118 to the engine 14. Since the heater return conduit 134 connects to the thermostat outlet 152, engine fluid can circulate through the heater core 118 independently of the operation of the thermostat 124. Thus, the thermal management system 112 can reduce or minimize the time for warming the passenger compartment.

The throttle body 120 can be configured to facilitate the transfer of heat from the engine fluid to the throttle body 120 in order to warm the throttle body. The throttle body 120 can receive engine fluid from the engine 14. The heater core 118 and the throttle body 120 can be connected to the engine 14 in parallel fluid communication. In other words, at any given instant in time, the fluid within a circuit that contains the heater core 118 is substantially (i.e., completely or almost completely) isolated from the fluid within a circuit that contains the throttle body 120 (both circuits excluding the engine 14 and functional connectors/valves).

A throttle supply conduit 136 can extend from the engine 14 to the throttle body 120 to provide communication of engine fluid from the engine 14 to the throttle body 120. As viewed in FIG. 2, the throttle supply conduit 136 can extend from the engine 14 at a position in fluid communication with the right bank portion 38.

A throttle return conduit 138 can extend from the throttle body 120 to the thermostat outlet 152 to provide communication of engine fluid from the throttle body 120 to the engine 14. Since the throttle return conduit 138 connects to the thermostat outlet 152, engine fluid can circulate through the throttle body 120 independently of the operation of the thermostat 124.

Thus, the thermal management system 112 can reduce or minimize the time for warming the passenger compartment and for generally stabilizing operating temperatures of the throttle body 120, engine 14, and transmission 16.

The conduits 136, 138 can be omitted, if desired.

The first heat exchanger 122 can receive engine fluid from the engine 14 and can receive transmission fluid from the transmission 16. In a transmission warming mode of operation of the thermal management system 112, the first heat exchanger 122 can facilitate the transfer of heat from the engine fluid to the transmission fluid in order to warm the transmission fluid. In a transmission cooling mode of operation of the system 112, the first heat exchanger 122 can facilitate the transfer of heat from the transmission fluid to the engine fluid in order to cool the transmission fluid. Further details of these two modes of operation will be provided below.

The thermal management system 112 can include a hot branch line that extends from the engine 14 to the first heat exchanger 122 to be in fluid communication. The control valve 126 can include a cool inlet, a warm inlet and an outlet 149. The hot branch line can include or can include or consist essentially of an exchanger supply conduit 140, the control valve 126 and the valve outlet 149. The exchanger supply conduit 140 can extend from the engine 14 to a warm inlet of the control valve 126 to provide communication of engine fluid from the engine 14 to the control valve 126 in a path parallel to each of the heater core path and the throttle body path (e.g., in a path in which no mixing of coolant occurs except upon return to the water jacket at the engine 14, just past the thermostat 124, for example). As viewed in FIG. 2, the exchanger supply conduit 140 can extend from the engine 14 at a position in fluid communication with the left bank portion 36.

An exchanger branch conduit 148 can extend from the main fluid return conduit 128 to a cool inlet of the control valve 126 to provide communication of engine fluid from the exchanger branch conduit 148 to the control valve 126.

The valve outlet 149 can connect the control valve 126 for communication of engine fluid from the control valve 126 to the first heat exchanger 122. If the control valve 126 is mounted directly to the first heat exchanger 122, the valve outlet 149 can be directly connected to the inlet of the first heat exchanger 122. If the valve 126 is mounted at a distance from the first heat exchanger 122, the valve outlet 149 can include a conduit extending from the control valve 126 to the first heat exchanger 122. Thus, a supply of engine fluid warmed by heat generated by the engine 14 is available to the first heat exchanger 122 and a supply of engine fluid cooled by the radiator 114 is available to the first heat exchanger 122.

An exchanger return conduit 142 can extend from the first heat exchanger 122 to the thermostat inlet 150 to provide communication of engine fluid from the first heat exchanger 122 to the thermostat 124. Thus, the thermostat 124 can control the flow of engine fluid to the first heat exchanger 122. Specifically, when the thermostat 124 closes fluid communication from the thermostat inlet 150 to the thermostat outlet 152, the flow rate of engine fluid from the bank portion 36 and/or the bank portion 38 to the exchanger supply conduit 140 can be restricted to zero or a negligible value or possibly a range between fully open and fully closed. Conversely, the thermostat 124 can permit fluid communication from the bank portion 36 and/or the bank portion 38 to the exchanger supply conduit 140 when the thermostat opens fluid communication between the inlet 150 and the outlet 152. As a result, the rate of heat transfer from the engine fluid to the transmission fluid via the exchanger 122 can be a negligible value during the cold-start condition. This can reduce or minimize the time elapsed for the engine fluid to reach at least the first predetermined temperature and the transmission fluid to reach at least the second predetermined temperature.

A transmission supply conduit 144 can extend from the transmission 16 to the control valve 126. The control valve 126 can include a second valve outlet 160. The second valve outlet 160 can connect the control valve 126 for communication of transmission fluid from the control valve 126 to the first heat exchanger 122. As will be discussed in detail below, the transmission fluid can effect operation of the control valve 126. However, the control valve 126 does not act on the flow of transmission fluid through the control valve 126. Thus, the transmission supply conduit 144, the control valve 126 and the second valve outlet 160 provide communication of transmission fluid from the transmission 16 to the first heat exchanger 122.

If the control valve 126 is mounted directly to the transmission 16, the transmission supply conduit 144 can be directly connected to the inlet of the control valve 126. If the control valve 126 is mounted at a distance from the transmission 16, the transmission supply conduit 144 can include a conduit extending from the control valve 126 to the first heat exchanger 122.

If the control valve 126 is mounted directly to the first heat exchanger 122, the second valve outlet 160 can be directly connected to the inlet of the first heat exchanger 122. If the control valve 126 is mounted at a distance from the first heat exchanger 122, the second valve outlet 160 can include a conduit extending from the control valve 126 to the first heat exchanger 122.

The control valve 126 can selectively connect the first heat exchanger 122 in communication with engine fluid from either the exchanger supply conduit 140 or the exchanger branch conduit 148. As a result, the heat exchanger 122 can either warm or cool the transmission fluid flowing through the heat exchanger 122.

The control valve 126 can be configured to open fluid communication between the exchanger branch conduit 148 and the first heat exchanger 122 and to simultaneously close fluid communication between the exchanger supply conduit 140 and the first heat exchanger 122 when the temperature of the transmission fluid flowing through the control valve 126 is greater than or equal to a second predetermined temperature. The control valve 126 can be configured to close fluid communication between the exchanger branch conduit 148 and the first heat exchanger 122 and to simultaneously open fluid communication between the exchanger supply conduit 140 and the first heat exchanger 122 when the temperature of the transmission fluid exiting the transmission 16 is less than a second predetermined temperature. The second predetermined temperature can correspond to an optimum operating temperature for the transmission fluid. Details of the structure of the control valve 126 will be discussed below.

As discussed above, when fluid communication is closed between the thermostat inlet 150 and the thermostat outlet 152, the flow rate of engine fluid through the exchanger 122 can be zero or a negligible value because the exchanger return conduit 142 is in fluid communication with the inlet 150.

While the thermostat 124 opens communication of engine fluid from the thermostat inlet 150 to the thermostat outlet 152, the first heat exchanger 122 can facilitate heat transfer from the engine fluid to the transmission fluid when the control valve 126 opens communication of engine fluid from the exchanger supply conduit 140 to the first heat exchanger 122 and closes fluid communication between the first heat exchanger 122 and the exchanger branch conduit 148. Thus, the time period for the transmission fluid to reach a temperature within a range of operating values can be minimized which can reduce the impact of the potentially adverse effects described above.

While the thermostat 124 opens communication of engine fluid from the thermostat inlet 150 to the thermostat outlet 152, the first heat exchanger 122 can facilitate heat transfer from the transmission fluid to the engine fluid when the control valve 126 closes fluid communication between the exchanger supply conduit 140 and the first heat exchanger 122 and opens communication of engine fluid from the exchanger branch conduit 148 to the first heat exchanger 122. Thus, the transmission fluid can be maintained within a range of temperature values that can be advantageous for transmission performance.

An intermediate conduit 162 can extend from the first heat exchanger 122 to an inlet of the by-pass valve 156 to provide fluid communication from the heat exchanger 122 to the by-pass valve 156. The by-pass valve 156 can have a first outlet in fluid communication with a transmission return conduit 146. The transmission return conduit 146 can extend from the valve 156 to the transmission 16 to provide communication of transmission fluid from the by-pass valve 156 to the transmission 16. The by-pass valve 156 can have a second outlet in fluid communication with the second heat exchanger 158.

The second heat exchanger 158 can include an outlet in fluid communication with the transmission return conduit 146 at a location downstream from the by-pass valve 156.

The by-pass valve 156 can selectively connect the first heat exchanger 122 in fluid communication with the transmission return conduit 146 or with the second heat exchanger 158 so that transmission fluid exiting the first heat exchanger 122 via the intermediate conduit 162 can either enter into or by-pass the second heat exchanger 158. As a result, the first heat exchanger 122, alone, can either warm or cool the transmission fluid flowing through the first heat exchanger 122 or, alternatively, the first heat exchanger 122 and the second heat exchanger 158 can sequentially cool the transmission fluid.

The by-pass valve 156 can be configured to open fluid communication from the first heat exchanger 122 to the transmission return conduit 146 and to simultaneously close fluid communication from the first heat exchanger 122 to the second heat exchanger 158 when the temperature of the transmission fluid exiting the first heat exchanger 122 is less than the second predetermined temperature. The by-pass valve 156 can be configured to close fluid communication from the first heat exchanger 122 to the transmission return conduit 146 and to simultaneously open fluid communication from the first heat exchanger 122 to the second heat exchanger 158 when the temperature of the transmission fluid exiting the first heat exchanger 122 is greater than or equal to a second predetermined temperature. The second predetermined temperature can correspond to an optimum operating temperature for the transmission fluid.

To accomplish this selective warming or cooling of the transmission fluid, the by-pass valve 156 can include an actuator and a valve structure. The actuator can be configured to cause the valve structure to selectively open fluid communication between the valve inlet and one of the two valve outlets while simultaneously closing fluid communication between the valve inlet and the other of the two valve outlets. The actuator can be in fluid communication with the intermediate conduit 162, the transmission return conduit 146, or both. The actuator can be a mechanical structure (such as, but not limited to a wax motor in combination with a spring) or the actuator can be an electrically driven device (such as, but not limited to a thermal sensor in electrical communication with a solenoid or an electric motor) that can be actuated by an input signal received from a thermal sensor and/or an electronic control unit.

Figure 3:
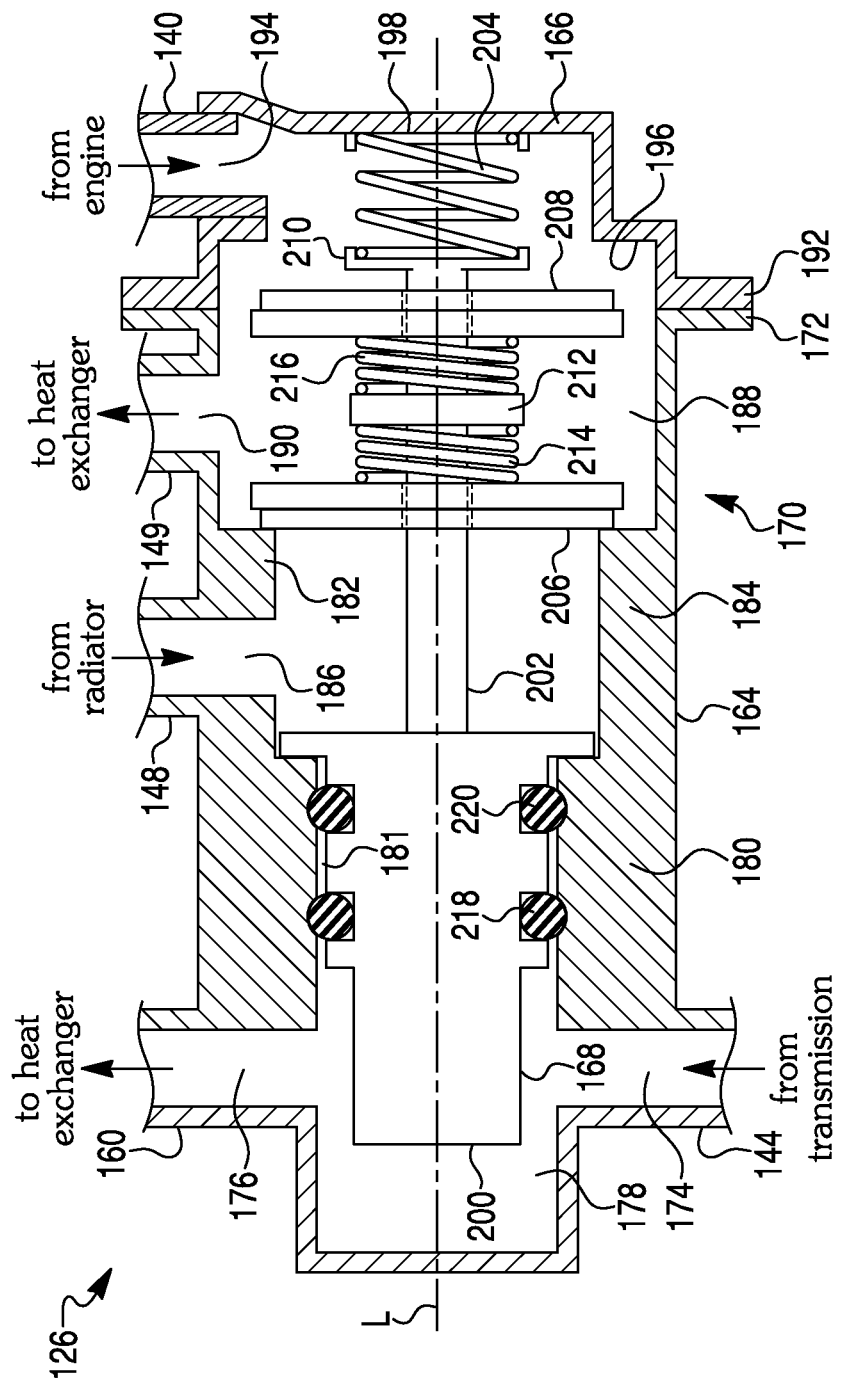
FIG. 3 is a cross-sectional view of an exemplary control valve made in accordance with principles of the disclosed subject matter.

FIG. 3 is a cross-sectional view of an exemplary control valve 126. To accomplish the selective warming or cooling of the transmission fluid, the control valve 126 can include a main housing 164, a housing cover 166, an actuator 168, a valve structure 170.

The main housing 164 can include a first annular flange 172, a first opening 174, a second opening 176, a fluid passage 178, a first annular projection 180, a second annular projection 182, a first chamber 184, a third opening 186, a second chamber 188, and a fourth opening 190.

The first flange 172 can be positioned at an opened end of the main housing 164. The first flange 172 can surround the opened end of the main housing 164. The housing cover 166 can include a second flange 192 positioned adjacent an opened end of the cover 166. The first and second flanges 172, 192 can be connected together in any appropriate manner such as but not limited to mechanical fasteners, welding, adhesive bonding, or clamps.

The first and second openings 174, 176 can be positioned at a closed end of the main housing 164 that is opposite to the opened end. The fluid passage 178 can extend from the first opening 174 to the second opening 176. The fluid passage 178 can be in fluid communication with the first opening 174 to the second opening 176.

The transmission supply conduit 144 can be connected to the main housing 164 at the first opening 174. The transmission supply conduit 144 can be in fluid communication with the first opening 174. The second valve outlet 160 can be connected to the main housing 164 at the second opening 176. The second valve outlet 160 can be in fluid communication with the second opening 176. Thus, transmission fluid exiting the transmission 16 via the transmission supply conduit 144 can flow through the control valve 126 and then to the first heat exchanger 122.

The first annular projection 180 can extend into the interior of the main housing 164. The first annular projection 180 can be positioned between the second opening 176 and the third opening 186.

The first annular projection 180 can include an inner passage 181 configured to receive the actuator 168. The actuator 168 can extend along a longitudinal axis L. The inner passage 181 can have an enhanced or maximum dimension measured substantially perpendicular to the longitudinal axis L that is less than a maximum dimension of the first chamber 184 measured substantially perpendicular to the longitudinal axis L.

The second annular projection 182 can extend into the interior of the main housing 164. The second annular projection 182 can be positioned between the first annular projection 180 and the opened end of the main housing 164.

The first chamber 184 can extend from the first annular projection 180 to the second annular projection 182.

The third opening 186 can be positioned between the first annular projection 180 and the second annular projection 182. The exchanger branch conduit can be connected to the main housing 164 at the third opening. The third opening 186 can be in fluid communication with the first chamber 184 and the exchanger branch conduit 148. Thus, engine fluid exiting the radiator 114 can enter the control valve 126 via the third opening 186.

The housing cover 166 can include the second flange 192, a fifth opening 194, a stepped portion 196, and a spring seat 198.

The second flange 192 can surround an opened end of the housing cover 166.

The second chamber 188 can extend from the second annular projection 182 of the main housing 164 to the stepped portion 196 of the housing cover 166.

The fourth opening 190 of the main housing 164 can be located between the second annular projection 182 of the main housing 164 and the stepped portion 196 of the housing cover 166. The first valve outlet 149 can be connected to the main housing 164 at the fourth opening. The fourth opening 190 can be in fluid communication with second chamber 188 and the first valve outlet 149. As will be explained in further detail below, engine fluid in the second chamber 188 can exit the valve 122 and enter the first heat exchanger 122 via the fourth opening 190 and the first valve outlet 149

The actuator 168 can be positioned in the main housing so that at least a portion of the actuator 168 extends into the fluid passage 178. The actuator 168 can be configured to cause the valve structure 168 to selectively open fluid communication between the first valve outlet 149 and one of the exchanger branch conduit 148 and the exchanger supply conduit 140 while simultaneously closing fluid communication between the valve outlet 149 and the other of the exchanger branch conduit 148 and the exchanger supply conduit 140.

The actuator 168 can include a wax motor 200, a connecting rod 202, and a return spring 204.

The wax motor 200 can extend into the fluid passage 178. The wax motor 200 can include a thermally responsive material, such as but not limited to wax, and a piston connected to the connecting rod and in communication with the thermally responsive material. The thermally responsive material can absorb heat from the transmission fluid flowing through the fluid passage 178. If the temperature of the transmission fluid exceeds a predetermined temperature, the thermally responsive material can expand, and thereby act on the piston to displace the connecting rod 202 toward the housing cover 166 against the biasing force of the return spring 204. If the temperature of the transmission fluid is below the predetermined temperature, the thermally responsive material can contract and the return spring 204 can urge the connecting rod 202 away from the housing cover 166.

The connecting rod 202 can be connected to the valve structure 170 to selectively open and close fluid communication between the first valve outlet 149, and each of the exchanger supply conduit 140 and the exchanger branch conduit 148, as the connecting rod 202 moves toward and away from the housing cover 166. Further details of the operation of the connecting rod 202 and the valve structure 170 will be discussed below.

The valve structure 170 can include a first disk 206 and a second disk 208. The first and second disks 206, 208 can be connected to the connecting rod 202 in any appropriate manner.

The second annular projection 182 of the main housing 164 can form a valve seat for the first disk 206. The first disk 206 can be configured to abut the valve seat of the second annular projection 182 in order to close fluid communication between the first chamber 184 and the second chamber 188.

The stepped portion 196 of the housing cover 166 can form a valve seat for the second disk 208. The second disk 208 can be configured to abut the valve seat of the stepped portion 196 in order to close fluid communication between the fifth opening 194 and the second chamber 188.

The first and second disks 206, 208 can be spaced apart by a predetermined distance so that if the connecting rod 202 moves and engages the first disk 206 with the valve seat of the second annular flange 192, then the connecting rod 202 moves the second disk 208 toward the middle of the second chamber 188 and out of engagement with the valve seat of the stepped portion 196. Further, the predetermined distance between the disks 206, 208 can be set so that if the connecting rod 202 moves and engages the second disk 206 with the valve seat of the stepped portion 196, then the connecting rod 202 moves the first disk 206 toward the middle of the second chamber 188 and out of engagement with the valve seat of the second annular projection 182.

The connecting rod 202 can include a flange 210. The flange 210 can support one end of the return spring 204 and the spring seat 198 of the housing cover 166 can support the other end of the return spring 204.

The connecting rod 202 can include a third annular projection 212. The valve structure 170 can include first and second springs 214, 216. The third annular projection 212 can support one end of each of the first and second springs 214, 216. The other end of the first spring 214 can engage the first disk 206. The other end of the second spring 216 can engage the second disk 208.

First and second seals 218, 220 can engage the outer surface of the wax motor 200 and the inner surface of the first annular projection 180 that defines the inner passage 181. The seals 218, 220 can seal the fluid passage 178 from the first chamber 184 so that mixing of the transmission fluid with the engine fluid can be prevented or at least discouraged.

The control valve 126 can be configured so that, if the temperature of the transmission fluid flowing in the fluid passage 178 is less than the predetermined temperature, or if no transmission fluid is flowing through the fluid passage 178, then the return spring 204 can urge the connecting rod 202 away from the housing cover 166, the first disk 206 can engage the valve seat of the second annular projection 182, and simultaneously, the second disk 208 can disengage from the valve seat of the stepped portion 196. Consequently, the control valve 126 can open fluid communication between the exchanger supply conduit 140 and the first valve outlet 149, and simultaneously close fluid communication between the exchanger branch conduit 148 and the first heat exchanger 122. In this operational state of the control valve 126, the control valve 126 can supply relatively warm engine fluid to the first heat exchanger 122 in order to heat the transmission fluid flowing through the first heat exchanger 122.

If the temperature of the transmission fluid flowing through the fluid passage 178 of the control valve 126 is greater than or substantially equal to the predetermined temperature, then the wax motor 200 can drive the connecting rod 202 toward the housing cover 166 so that the so that first disk 206 can disengage from the valve seat of the second annular projection 182, and simultaneously, the second disk 208 can engage the valve seat of the stepped portion 196. Consequently, the control valve 126 can close fluid communication between the exchanger supply conduit 140 and the first valve outlet 149, and simultaneously open fluid communication between the exchanger branch conduit 148 and the first heat exchanger 122. In this operational state of the control valve 126, the control valve 126 can supply relatively cool engine fluid to the first heat exchanger 122 in order to cool the transmission fluid flowing through the first heat exchanger 122.

Figure 4:
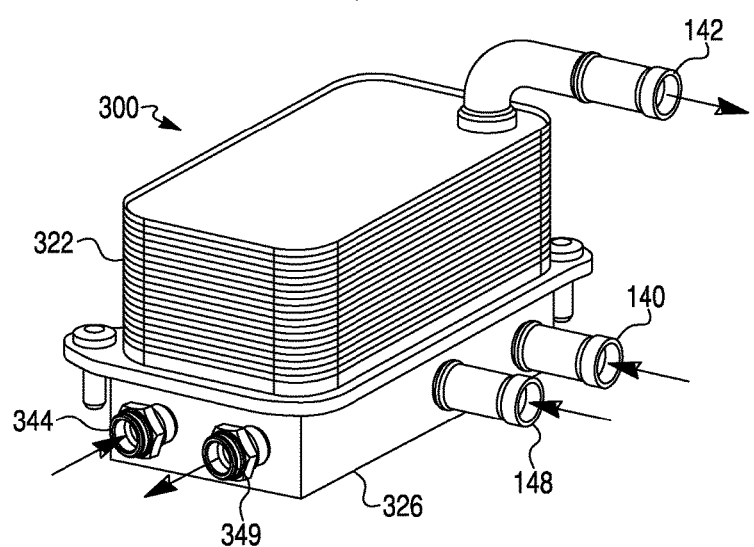
FIG. 4 is a perspective view of an exemplary heat transfer assembly of a thermal management system for a vehicle made in accordance with principles of the disclosed subject matter.

FIG. 4 illustrates an exemplary embodiment of a heat exchanger assembly 300 for a thermal management system of a vehicle. The heat exchanger assembly 300 can include heat exchanger 322 and a control valve 326 integrated with the heat exchanger 322. The heat exchanger assembly 300 can be mounted directly to the housing of the transmission 16. The heat exchanger 322 and the control valve 326 can operate and interact with other component(s) and system(s) of the thermal management system as described above with respect to the first heat exchanger 122 and the control valve 126. If the heat transfer assembly 300 is mounted directly to the transmission 16, then the transmission supply conduit 144 and the first valve outlet 149 of FIG. 2 can be configured as ports 344, 349 that can engage the supply and return ports formed in the housing of the transmission 16.

2. Alternative Embodiments

While certain embodiments of the invention are described above, and FIGS. 1-4 disclose the best mode for practicing the various inventive aspects, it should be understood that the invention can be embodied and configured in many different ways without departing from the spirit and scope of the invention.

For example, embodiments are disclosed above in the context of mechanically operated valves, and in particular valves that are operated by a wax-motor actuator shown in FIG. 3. However, embodiments are intended to include or otherwise cover any type of valve disclosed above. For example, any of the valves can include an actuator configured as an electrically driven device (such as, but not limited to, a thermal sensor in electrical communication with a solenoid or an electric motor) can be actuated by an input signal received from a thermal sensor and/or an electronic control unit. The thermal sensor can be in fluid communication with the transmission supply conduit 144.

Exemplary embodiments are also intended to include or otherwise cover different conduit configurations. For example, the exchanger branch conduit 148 can extend directly from the radiator 114 to the control valve 126.

In another example, the control valve 126 can be configured to selectively open fluid communication between the valve outlet 149 and one of the warm inlet and the cool inlet while simultaneously closing fluid communication between the valve outlet 149 and the other of the warm inlet and the cool inlet, or to simultaneously open fluid communication between the valve outlet 149 and both of the warm inlet and the cool inlet.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:
1. A thermal management system for a vehicle including an engine and a transmission, the thermal management system comprising:
　a radiator configured for fluid communication with the engine;
　a first heat exchanger configured for fluid communication with the transmission;
　a hot branch line configured for fluid communication with the engine;
　an exchanger branch conduit in fluid communication with the radiator;
　a control valve in fluid communication with the hot branch line, the exchanger branch conduit, and the first heat exchanger and configured to selectively connect the hot branch line in fluid communication with the first heat exchanger and to selectively connect the exchanger branch conduit in fluid communication with the first heat exchanger;
a second heat exchanger in selective fluid communication with the first heat exchanger, and configured for direct fluid communication with the transmission;
a by-pass valve in fluid communication with the first heat exchanger and the second heat exchanger, configured for fluid communication with the transmission, and configured to selectively operate in a first mode and selectively operate in a second mode, wherein
when in the first mode, fluid from the first heat exchanger bypasses the second heat exchanger and flows to the transmission, and
when in the second mode, fluid from the first heat exchanger flows through the second heat exchanger and then flows to the transmission,
a thermostat including an inlet, an outlet, and a valve structure, the inlet being in fluid communication with the radiator, the outlet being configured for fluid communication with the engine, and the valve structure movable between a first position and a second position such that when the valve is in the first position the valve substantially prevents fluid communication between the inlet and the outlet, and when the valve is in the second position the inlet is in fluid communication with the outlet; and
an exchanger return conduit in fluid communication with each of the first heat exchanger and the inlet of the thermostat.

2. The thermal management system according to claim 1, wherein the control valve is configured for fluid communication with the transmission and selectively connects the heat exchanger to one of the hot branch line and the exchanger branch conduit based on a temperature of a fluid flowing from the transmission and into the control valve.

3. The thermal management system according to claim 1, wherein the control valve includes:
a first opening configured for fluid communication with the transmission;
a second opening in fluid communication with the first opening and with the first heat exchanger;
a third opening in fluid communication with the exchanger branch conduit;
a fourth opening in fluid communication with the hot branch line;
a fifth opening in fluid communication with the first heat exchanger; and
a valve structure movable between a first position and a second position, if in the first position, the valve structure selectively opens fluid communication between the fourth opening and the fifth opening thereby placing the hot branch line in fluid communication with the first heat exchanger, if in the second position, the valve structure selectively opens fluid communication between the third opening and the fifth opening thereby placing the exchanger branch conduit in fluid communication with the first heat exchanger.

4. The thermal management system according to claim 1, wherein the control valve is mounted directly to the first heat exchanger.

5. The thermal management system according to claim 1, wherein the control valve is configured to be mounted directly to the transmission.

6. The thermal management system according to claim 1, wherein control valve and the first heat exchanger are integrated into a heat transfer assembly, and the heat transfer assembly is configured to be mounted directly to the transmission.

7. The thermal management system according to claim 1, further comprising:
a heater core in ambient fluid communication with a passenger compartment of the vehicle, the heater core being in separate fluid communication with the engine and the outlet of the thermostat such that fluid from the heater core returns directly to the engine and fluid from the engine flows to the heater core along a first circuit, and fluid from the engine flows to the first heat exchanger along a second circuit, and the first circuit and second circuit are parallel circuits with respect to each other.

8. The thermal management system according to claim 1, further comprising:
a heater core, wherein,
the engine includes a first bank having at least a first cylinder and a second bank having at least a second cylinder,
the first bank is in fluid communication with the hot branch line, and
the second bank is in fluid communication with the heater core.

9. A vehicle configured to carry at least one passenger, the vehicle comprising:
an engine including an engine fluid flowing therethrough;
a transmission including a transmission fluid flowing therethrough;
a passenger compartment containing an ambient fluid; and
a thermal management system in fluid communication with each of the engine, the transmission, and the passenger compartment, the thermal management system configured to exchange heat between the engine fluid, the transmission fluid, the ambient fluid in the passenger compartment, and ambient fluid external to the passenger compartment, the thermal management system including:
a radiator in fluid communication with the engine and configured to exchange heat between the engine fluid and the ambient air external to the passenger compartment;
a first heat exchanger in fluid communication with the transmission and configured to exchange heat between the engine fluid and the transmission fluid;
a hot branch line in fluid communication with the engine;
an exchanger branch conduit in fluid communication with the radiator;
a control valve in fluid communication with the hot branch line, the exchanger branch conduit, and the first heat exchanger and configured to selectively connect the hot branch line in fluid communication with the first heat exchanger and to selectively connect the exchanger branch conduit in fluid communication with the first heat exchanger;
a second heat exchanger in selective fluid communication with the first heat exchanger,
in fluid communication with the transmission, and configured to exchange heat between the transmission fluid and the ambient fluid external to the passenger compartment;
a by-pass valve in fluid communication with each of the first heat exchanger, the second heat exchanger, and the transmission, and configured to selectively operate in a first mode and selectively operate in a second mode, wherein when in the first mode, fluid from the first heat exchanger bypasses the second heat exchanger and flows to the transmission, and when in the second mode, fluid from the first heat exchanger flows through the second heat exchanger and then flows to the transmission, a thermostat including an inlet, an outlet, and a valve structure, the inlet being in fluid communication with the radiator, the outlet being in fluid communication with the engine, and the valve structure movable between a first position and a second position such that when the valve is in the first position the valve substantially prevents fluid communication between the inlet and the outlet, and when the valve is in the second position the inlet is in fluid communication with the outlet; and an exchanger return conduit in fluid communication with each of the first heat exchanger and the inlet of the thermostat.

10. The vehicle according to claim 9, wherein the control valve is in fluid communication with the transmission and selectively connects the heat exchanger to one of the hot branch line and the exchanger branch conduit based on a temperature of a fluid flowing from the transmission and into the control valve.

11. The vehicle according to claim 9, wherein the control valve includes:
a first opening in fluid communication with the transmission;
a second opening in fluid communication with the first opening and with the first heat exchanger;
a third opening in fluid communication with the exchanger branch conduit;
a fourth opening in fluid communication with the hot branch line;
a fifth opening in fluid communication with the first heat exchanger; and
a valve structure movable between a first position and a second position, if in the first position, the valve structure selectively opens fluid communication between the fourth opening and the fifth opening thereby placing the hot branch line in fluid communication with the first heat exchanger, if in the second position, the valve structure selectively opens fluid communication between the third opening and the fifth opening thereby placing the exchanger branch conduit in fluid communication with the first heat exchanger.

12. The vehicle according to claim 9, wherein the control valve is mounted directly to the first heat exchanger.

13. The vehicle according to claim 9, wherein the control valve is mounted directly to the transmission.

14. The vehicle according to claim 9, wherein the control valve and the first heat exchanger are integrated into a heat transfer assembly, and the heat transfer assembly is mounted directly to the transmission.

15. The vehicle according to claim 9, further comprising:
a heater core in ambient fluid communication with the passenger compartment, the heater core being configured to exchange heat between the engine fluid and the ambient fluid in the passenger compartment, the heater core being in separate fluid communication with the engine and the outlet of the thermostat such that fluid from the heater core returns directly to the engine and fluid from the engine flows to the heater core along a first circuit, and fluid from the engine flows to the first heat exchanger along a second circuit, and the first circuit and second circuit are parallel circuits with respect to each other.

16. A method for directing fluid through a vehicle thermal management system, the method comprising:
providing an engine including engine fluid configured to flow through the engine, a transmission including a transmission fluid flowing therethrough, a radiator configured for fluid communication with the engine, a first heat exchanger configured for fluid communication with each of the engine and the transmission, a hot branch line configured for fluid communication with the engine, an exchanger branch conduit in fluid communication with the radiator, a control valve in fluid communication with the hot branch line, the exchanger branch conduit, and the first heat exchanger and configured to selectively connect the hot branch line in fluid communication with the first heat exchanger and to selectively connect the exchanger branch conduit in fluid communication with the first heat exchanger, a second heat exchanger in selective fluid communication with the first heat exchanger, and configured for fluid communication with the transmission, and a by-pass valve in fluid communication with the first heat exchanger and the second heat exchanger, configured for fluid communication with the transmission, and configured to selectively operate in a first mode and selectively operate in a second mode;

connecting one of the hot branch line and the exchanger branch conduit in fluid communication with the first heat exchanger and simultaneously disconnecting another of the hot branch line and the exchanger branch conduit from fluid communication with the first heat exchanger based on a temperature of the transmission fluid flowing through the control valve;

selectively operating the by-pass valve in the first mode so that transmission fluid from the first heat exchanger bypasses the second heat exchanger and flows to the transmission;

selectively operating the by-pass valve in the second mode so that transmission fluid from the first heat exchanger flows through the second heat exchanger and then flows directly to the transmission;

providing a thermostat including an inlet, an outlet, and a valve structure, the inlet being in fluid communication with the radiator, the outlet being in fluid communication with the engine, and the valve structure movable between a first position and a second position such that when the valve is in the first position the valve substantially prevents fluid communication between the inlet and the outlet, and when the valve is in the second position the inlet is in fluid communication with the outlet; and connecting an exchanger return conduit in fluid communication with each of the first heat exchanger and the inlet of the thermostat.

* * * * *